US009477703B1

(12) United States Patent
Criss

(10) Patent No.: US 9,477,703 B1
(45) Date of Patent: Oct. 25, 2016

(54) ITEM VERSION SIMILARITY SCORING SYSTEM

(71) Applicant: Amazon Technologies, Inc., Reno, NV (US)

(72) Inventor: David Andrew Criss, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 235 days.

(21) Appl. No.: 13/971,162

(22) Filed: Aug. 20, 2013

(51) Int. Cl.
*G06F 17/30* (2006.01)

(52) U.S. Cl.
CPC .............................. *G06F 17/30386* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,146,552 A * | 9/1992 | Cassorla | ................ | G06Q 10/10 715/200 |
| 6,061,697 A * | 5/2000 | Nakao | ................ | G06F 17/2247 707/999.003 |
| 7,921,071 B2 * | 4/2011 | Hicks | ................ | G06Q 30/0269 706/52 |
| 8,165,998 B2 | 4/2012 | Semerdzhiev | | |
| 8,280,723 B1 | 10/2012 | Laaser et al. | | |
| 2006/0178862 A1* | 8/2006 | Chan et al. | ................ | 703/11 |
| 2006/0190275 A1* | 8/2006 | Dupree | ................ | G06Q 10/10 705/310 |
| 2007/0033112 A1* | 2/2007 | Nagle, Jr. | ................ | G06Q 30/08 705/26.62 |
| 2010/0257141 A1* | 10/2010 | Monet | ................ | G06F 17/30011 707/665 |
| 2010/0306412 A1* | 12/2010 | Therrien | ................ | H03M 7/3084 709/247 |
| 2011/0197121 A1* | 8/2011 | Kletter | ................ | G06F 17/2211 715/234 |
| 2011/0276863 A1* | 11/2011 | Bhise | ................ | G06F 17/30905 715/201 |
| 2012/0079372 A1* | 3/2012 | Kandekar | ................ | G06F 17/2745 715/256 |
| 2013/0117246 A1* | 5/2013 | Cabaniols | ................ | G06F 17/2211 707/697 |

OTHER PUBLICATIONS

Wikipedia String Metric, http://en.wikipedia.org/wiki/String_metric/, last accessed Jul. 19, 2013, pp. 1-2.
Computer Algorithms: Brute Force String Matching, http://www.stoimen.com/blog/2012/03/27/computer-algorithms-brute-force-string-matching/, last accessed Aug. 16, 2013, pp. 1-6.

* cited by examiner

*Primary Examiner* — Etienne Leroux
(74) *Attorney, Agent, or Firm* — Knobbe, Martens, Olson & Bear, LLP

(57) ABSTRACT

Generally described are systems and methods for conducting content differential analysis on multiple versions of an item, such as a book published with multiple editions or an item released with multiple versions. A version similarity scoring system may be configured to perform such content differential analysis on item content between two or more versions, and generate one or more similarity scores or assessments between versions. Similarity scores may be generated for the item as a whole as well as for some or all particular content portions or features of the item. The similarity scores for various versions may be provided to consumers viewing item detail pages for a multi-version item, as well as to vendors as part of purchase planning and market price setting decision processes.

27 Claims, 7 Drawing Sheets

ITEM VERSION SIMILARITY SCORING SYSTEM

BACKGROUND

Products and services ("items") are constantly changing and evolving. New information, discoveries and advances across nearly all areas of today's culture naturally lead not only to "brand new" products and services, but also to countless new versions, editions, updates and revisions of existing products and services, such as books, publications, software, technology and everything else in between. Even mattresses evolve and change over time, which changes may or may not be welcome to consumers. While consumers frequently benefit from the plethora of choices and "new and improved" versions of everyday things, all too often consumers may not truly know what exactly has changed, or by how much. This may be particularly true of items in which the difference between a new version and an old item cannot be fully appreciated until the content of the item is determined, such as may be the case with books which undergo periodic revisions.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Figure 1:
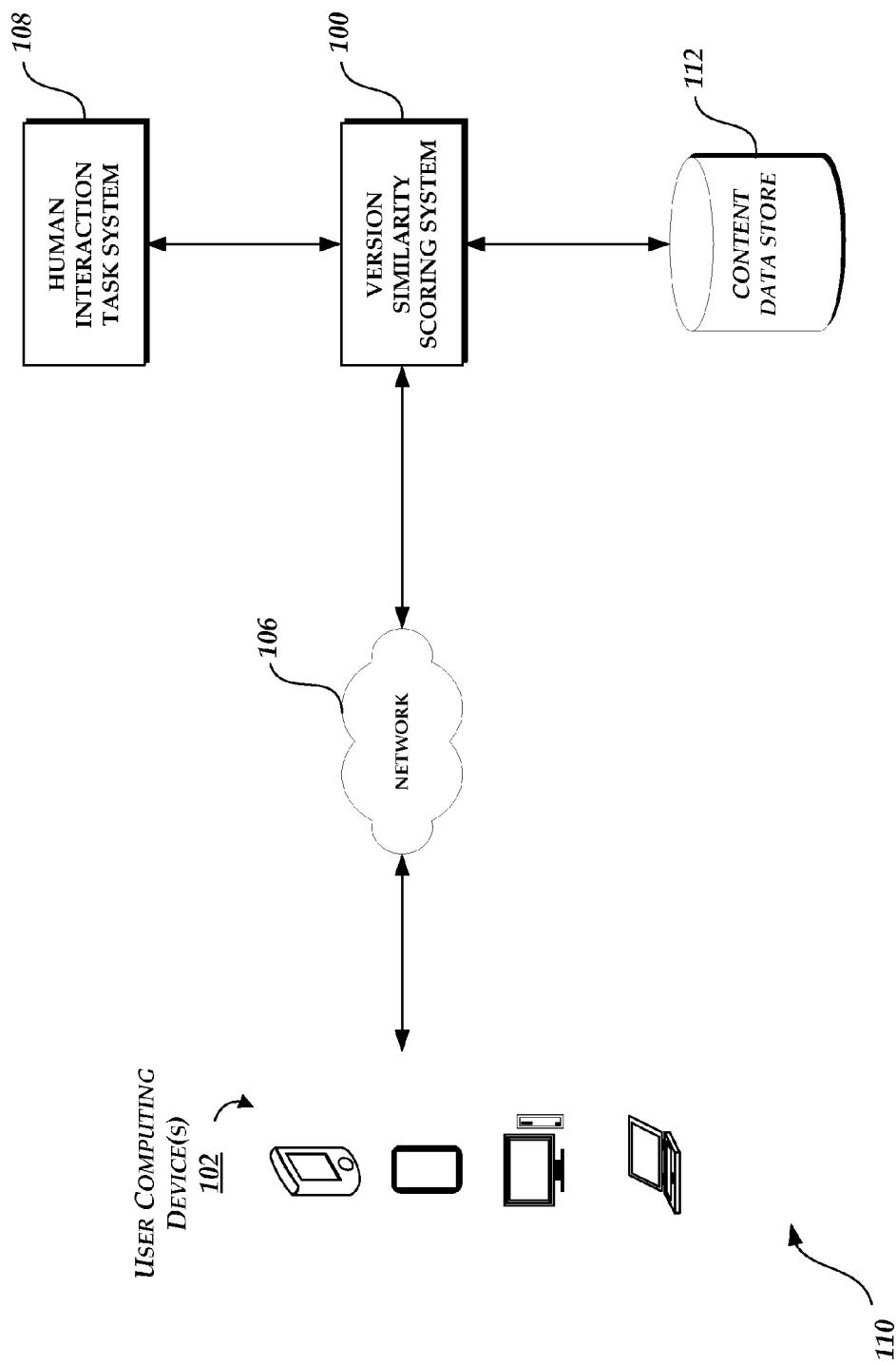
FIG. 1 is a block diagram depicting an illustrative network environment in which a version similarity scoring system may operate.

This disclosure describes embodiments of systems and methods for performing content differential analysis between multiple versions of an item, generating similarity "scores" or ratings between versions, and providing the similarity scores for use in informed purchasing or acquiring decisions. One example in which this may be of particular value to a consumer contemplating whether to buy a "latest" version, model, or edition of an item, is in the field of textbooks. Textbooks frequently undergo ongoing revisions, especially in academic areas of study in which new discoveries are actively being made, such as in the sciences. New editions of textbooks often contain valuable new information related to these discoveries, but in many instances new editions also contain much of the same content as earlier editions. Students and professors alike frequently face the dilemma of whether the latest edition is needed or wanted. For example, a student may wonder if the latest edition is needed for a particular course, or if an earlier edition may still be sufficiently "up to date" to get through the course. The student might not have enough time to read or even scan through and compare different versions of a textbook to "see" what—and/or how much—is new content. A professor teaching a course may similarly want to know whether the latest edition needs to be, or should be, used as a course textbook. Thus, students and professors may benefit from having access to, or being provided, easy to understand (e.g., "at-a-glance") similarity information related to different versions of textbooks to help inform their purchasing decisions.

Along with the consumer, a vendor, a distributor or a marketplace operator may also benefit from accurate and concise similarity information. For example, commonly the market prices for "used" or older-version items—in particular textbooks—tend to be much lower than the market prices for new editions or versions of those items. However, it may be true in some instances that some used and/or older-version items are sufficiently similar to their "new" equivalents that more consumers may be motivated to purchase the used or older version. That it, used or older versions of some items today may actually be undervalued, and a more accurate similarity assessment could help to adjust the market price of such items. Upwards-adjusted prices may lead to greater sales revenue for the vendor, the distributor and/or the marketplace operator, which may otherwise receive less than the "worth" of used or older versions.

While many of the examples described herein discuss a version similarity scoring system with respect to books and/or textbooks specifically, the version similarity scoring systems and methods may be broadly applied to a variety of items which undergo frequent or recurring revisions or versioning. For example, portable electronic devices such as laptops, smartphones, tablets and the like, as well as software and operating systems, often undergo item refreshes on an annual or even semi-annual basis. While some tech-savvy consumers might be "in the know" about what changes or updates each of these item refreshes brings, it may be true that the average consumer might not fully understand what all the changes mean, or might simply prefer to know "how much has this item really changed?" Item manuals, marketing feature tables and side-by-side comparison charts may, in some instances, be informationally dense, which may reduce their value or usefulness to many consumers who value brevity and conciseness. This may be particularly true as updates become more frequent and/or consumers have less time to comparison shop. Thus, a similarity "score" or rating as generated and provided by the version similarity scoring systems and methods described herein may be of great benefit to the consumer who wants a quick, concise answer to the question "how much has this item really changed?"

In general, various implementations of the version similarity scoring systems and methods described herein operate by accessing content associated with an item (e.g., an electronic copy of a textbook's text, an item manual, etc.), determining one or more versions of the item (e.g., multiple editions of the textbook, multiple versions of an item, etc.) and performing a content differential analysis across the one or more versions of the item to assess whether and/or how much of the content (or, as the case may be, item features) has changed. Content differential analysis may be performed at various levels, such as at a high-level (e.g., titles, headings, section indicators, page count and/or length comparisons) or at lower levels (e.g., full text comparison using one or more "brute force" textual or string comparison techniques which may involve, for example, checking or comparing every single character or word in a base version against a pattern of characters or words in a comparison version in order to determine whether and/or to what extent the pattern is found in the base version). In some embodiments the content differential analysis may be aided by human interaction tasks in which certain qualitative information may be provided by human input and used as part of the overall differential analysis process. In some embodiments, content differential analysis may be performed periodically and/or automatically when updates to an item are published or otherwise detected by the version similarity scoring system. For example, electronic books often receive updates and/or errata which may occur in between regular, edition based updates. The version similarity scoring system may perform content differential analysis as these updates are rolled out and received by the version similarity scoring system.

From the content differential analysis, the version similarity scoring system may generate similarity scores (e.g., scores, rankings, ratings or any other indicator of a degree of similarity) between one or more versions of the item. Similarity scores may be in a variety of formats such as a numeric value (e.g., 90, 100, 1000), a numeric range (e.g., 1-10, 1-100), a percentage value (e.g., 95%), a letter score (e.g., A-F), a graphic (e.g., 4 stars or thumbs up/down), combinations of the foregoing, and so on. Similarity scores may be generated between any two versions of an item, whether the two versions are sequential or "adjacent" in time or whether the two versions are otherwise arbitrarily compared. For example, an item with three versions (e.g., V1, V2, and V3) may have at least three similarity scores: V1 vs. V2, V1 vs. V3, and V2 vs. V3. In some embodiments, similarity scores may also be generated for one or more content portions or sub-components of the item or the item's content. For example, a textbook may have one or more similarity scores corresponding to different sections of the textbook, including for example a title, a table of contents, each chapter and various other sections of the book. These "sub"-scores may be generated separately from the overall similarity score, and/or the overall similarity score may be based at least in part on the sub-scores (e.g., using a weighting technique such as a weighted average). In another example, an electronic device may have one or more similarity scores corresponding to different components of the device, including for example a CPU, a memory, a RAM, a battery, a screen size/resolution, an operating system, etc.

The similarity scores generated by the version similarity scoring system may be provided to various users. For example, consumers shopping an electronic catalog site may be presented with similarity score information when viewing network pages describing items "item detail pages) that have multiple versions/editions available. Such similarity information may be displayed either on the "newest" or "latest" version detail page, or on older version detail pages, or both. In another example, the similarity scores may be provided to vendors and/or marketplace operators as part of an inventory purchasing and planning system. For example, vendors might wish to know to what extent particular items may be similar to older versions to determine whether the new version should be ordered from a supplier or manufacturer, as well as what price to set for older versions depending on how outdated (or relevant) the older versions may be. For example, a vendor might set a lower price for a version of an item which has a similarity score of 50/100 (relative to the newest version) than for a version of an item which has a similarity score of 75/100 (relative to the newest version).

The version similarity scoring systems described herein may operate on many different types of content. Generally described, content can refer to any data that can be directly or indirectly accessed by a user, including, but not limited to audiobooks, electronic books, songs, videos, television programs, computer and video games, multi-media content, digital images, digital video, displayable text, audio data, electronic documents, software applications or programs, mobile applications, computer-executable code, blocks or portions of the foregoing, and the like. In some embodiments, content may also refer to a scanned, digitized, or otherwise electronic representation of a physical printed copy of the content. Content may also refer to and/or include metadata about an item or the item's content, such as information about one or more content portions, segments, sections, and the like. One example of this is the various sections of a typical book: a title, a table of contents, a preface, bibliographic data, one or more chapters, sections within chapters, and so on. Accordingly, "item of textual content" may generally refer to any electronic item of content that includes text. Likewise, "item of audio content" may generally refer to any electronic item of content that includes audio content.

In general, examples described herein which refer to "similarity" of versions and/or content may also be understood to encompass differences, dissimilarity, degree of match and/or degree of mis-match, differences of addition, deletion, and/or re-arrangement, and any other variation thereof. That is, any example discussed herein which involves two versions exhibiting characteristics of similarity may also be described vice versa—for example, as exhibiting characteristics of dissimilarity, differences and the like. All such variations are covered by the present disclosure.

Examples described herein may refer to different versions of an item or content. However, in some instances, different versions of an item or content may be partially or wholly identical (other than, for example, a version number or a unique identifier), such that a base version and a comparison version may be the same or substantially the same. Further, as used herein, version and/or edition may be used interchangeably to refer to the general description that multiple variations on a particular item or a particular item of content may be possible. In some instances, version and/or edition may refer to domestic and/or international versions and/or editions of items (e.g., a domestic edition of a textbook vs. an international edition of the textbook). Some examples described herein may refer to a comparison of a "first" and a "second" version/edition of an item; however, such examples are merely illustrative and not meant to be limited to a comparison of a literal first version/edition to a literal second version/edition. Rather, these examples are meant to apply broadly to a comparison of any "base" version/edition to a "comparison" version/edition. For example, a comparison may involve analyzing the similarity or difference between a first edition of a book and a third edition of a book; between a fourth version of an item and a tenth version of an item; between a first version of an item and a "most recent" version of an item; and so on, with any possible combination comparing two or more versions of an item.

In some embodiments, versions may also refer to, for example, different versions of a type of item, and in some cases the different versions may be produced, marketed, manufactured and/or distributed by different entities. For example, the version similarity scoring system may be configured to compare competing items of the same type or category (e.g., two different brands of smartphones which exhibit similar attributes or characteristics) and generate similarity information.

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential to each embodiment.

Examples of Version Similarity Scoring Systems

FIG. 1 is a general architecture diagram schematically illustrating an example of a version similarity scoring ("VSS") system 100 that performs and provides the content and/or item version similarity services described herein, including analyzing different versions of items and/or content, and generating similarity scores and/or ratings relative to two or more versions. As shown in FIG. 1, the VSS system 100 may be part of a network environment 110 and in communication with a user computing device 102, a human interaction task system 108 and a content data store 112. In some embodiments, the network environment 110 may also include, interact with, or otherwise have access to an item catalog data store (not shown in FIGS. 1 and 2), which may include information about an electronic catalog of items, including multiple versions of those items, which may be available for purchase or rent from an electronic marketplace. These systems and/or components may be in communication with each other either locally or over the network 106.

The user computing device 102 may be any computing device capable of communicating over the network 106, such as a laptop or tablet computer, personal computer, personal digital assistant (PDA), hybrid PDA/mobile phone, mobile phone, electronic book reader, set-top box, camera, audiobook player, digital media player, video game console, in-store kiosk, television, one or more processors, integrated components for inclusion in computing devices, appliances, electronic devices for inclusion in vehicles or machinery, gaming devices, or the like. The user computing device 102 may generally be capable of presenting content to a user of the user computing device 102. For example, the user computing device 102 may be capable of playing audio content by directing audible output through speakers, headphones, or the like. The user computing device 102 may also be capable of displaying textual content, graphical content, or video content on a display screen. The user computing device 102 may also be capable of communicating over the network 106, for example, to request content information from the VSS system 100. In some embodiments, the user computing device 102 may include non-transitory computer-readable medium storage for storing content information and items of content, such as electronic books and audiobooks.

The network 106 may be any wired network, wireless network, or combination thereof. In addition, the network 106 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

A human interaction task system 108 may be included in the network environment 110 to assist the VSS system 100. Generally described, the human interaction task system 108 is a computerized system that electronically processes human interaction tasks (HITs). A HIT may be a difficult, time-consuming, or expensive task for a computing device to perform. However, it might be relatively easy and quick for a human to perform a HIT. Accordingly, the human interaction task system 108 might request a human worker to perform a HIT, e.g., for gathering information or answering a query, and to return the results or answers to the human interaction task system 108 for further processing and/or presentation to the requestor. Thus, in some embodiments, the VSS system 100 directs the human interaction task system 108 to pose one or more queries about an item of content to a human worker of the human interaction task system 108. For example, a human worker may be asked to compare two or more items of textual content, or to identify portion boundaries in the item of textual content, such as paragraphs or sentences, or to provide input on some other qualitative difference between versions of content in general. In the example of an item of content in the format of a book, portion boundaries may also include, for example, a title, a table of contents, chapters, sections, appendix, bibliography or any other portion or segment of the book. The human worker may also be asked to identify or classify front matter, back matter, footnotes, diagrams, tables, graphs, and body text in an item of textual content. The human interaction task system 108 may receive answers to these queries and transmit them to the user computing device 102 or the VSS system 100 to guide the operation of the VSS system 100. The human worker of the human interaction task system 108 may volunteer or be selected to respond to these and other tasks and to communicate other information about the item of content to the VSS system 100.

In one embodiment, the VSS system 100 is a computing device that may perform a variety of tasks to implement the VSS system 100. For example, the VSS system 100 may analyze multiple versions of an item of content and generate content similarity information therefrom. This content similarity information may be provided by the VSS system 100 to a user computing device 102 over the network 106. Additional operations of the VSS system 100 are described in further detail with respect to FIG. 2.

The VSS system 100 may be in communication with a content data store 112. The content data store may store one or more items of content, such as items of textual content (e.g., electronic books), items of audio content (e.g., audiobooks), or other items of content. The content data store may also be configured to store version similarity information generated or obtained by the VSS system 100. The content data store 112 may be embodied in hard disk drives, solid state memories, and/or any other type of non-transitory, computer-readable storage medium remotely or locally accessible to the VSS system 100. The content data store 112 may also be distributed or partitioned across multiple storage devices. The data stored in the content data store 112 may be provided by, or accessed from, a third party data store (e.g., a book publisher, an item manufacturer, etc.) and/or from a user (e.g., a consumer who wishes to compare two versions of content the consumer herself provides) in communication with the VSS system 100.

The user computing device 102 and VSS system 100 may each be embodied in a plurality of components, each executing an instance of the respective content user computing device 102 and VSS system 100. A server or other computing system implementing the user computing device 102 and VSS system 100 may include a network interface, memory, processing unit, and computer readable medium drive, all of which may communicate with each other by way of a communication bus. The network interface may provide connectivity over the network 106 and/or other networks or computer systems. The processing unit may communicate to and from memory containing program instructions that the processing unit executes in order to operate the user computing device 102 and VSS system 100. The memory generally includes RAM, ROM, and/or other persistent and/or auxiliary non-transitory computer-readable storage media.

Any of the devices described herein are optional, and embodiments of the network environment 110 may or may not combine devices. Furthermore, devices need not be distinct or discrete. Devices may also be reorganized in the network environment 110. For example, the VSS system 100 may be represented in a single physical server or, alternatively, may be split into multiple physical servers. The entire VSS system 100 may be represented in a single user computing device 102 as well.

Additionally, it should be noted that in some embodiments, the VSS system 100 may be executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some embodiments, the VSS system 100 is hosted or operated by a third-party entity that is distinct from entities that produce (e.g., make, manufacture, publish, etc.) the items analyzed by the VSS system 100 as described herein.

Figure 2:
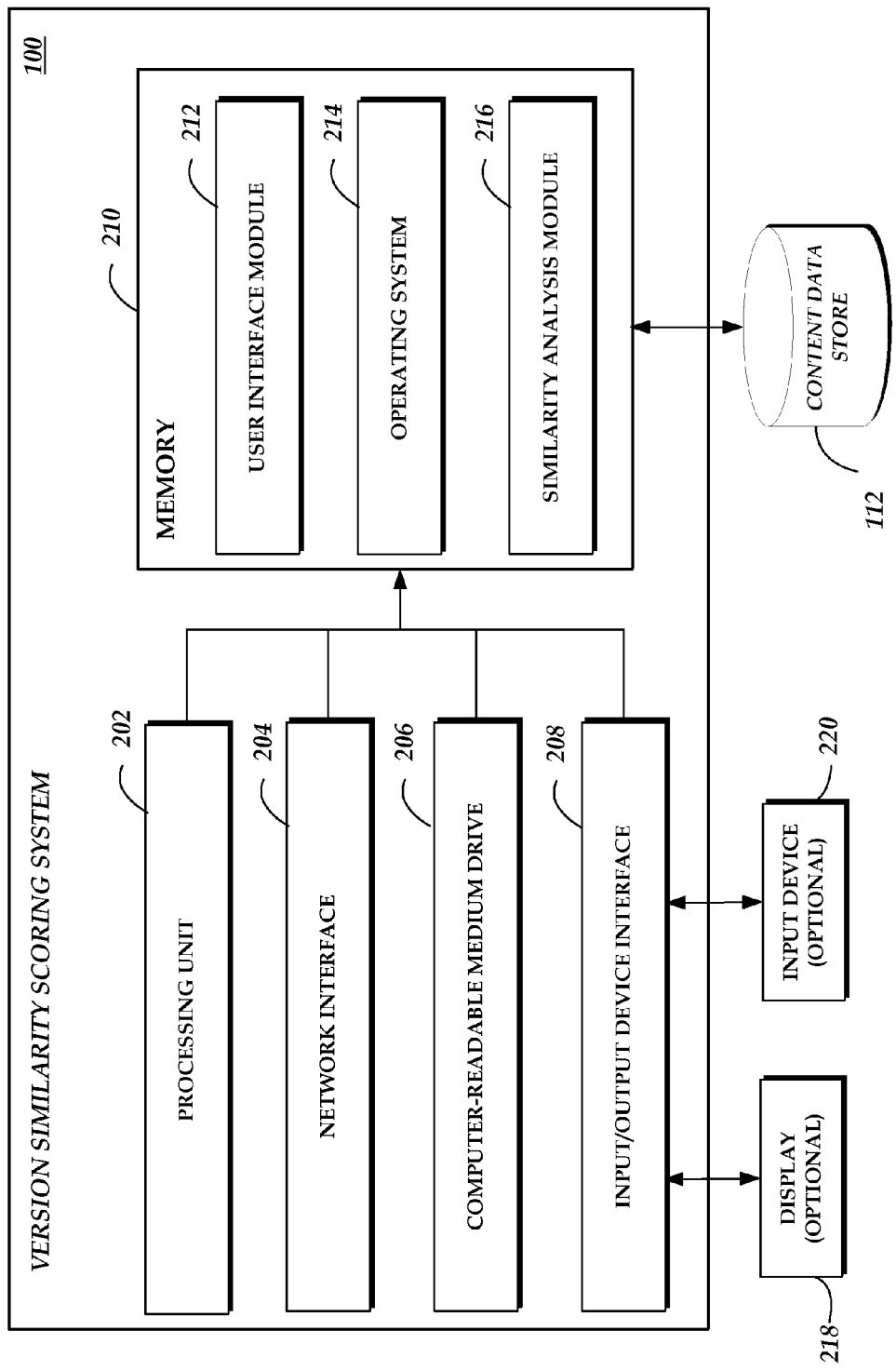
FIG. 2 is a block diagram depicting an illustrative version similarity scoring system.

FIG. 2 is a schematic diagram of the VSS system 100 shown in FIG. 1. The VSS system 100 may include an arrangement of computer hardware and software components that may be used to implement the VSS system 100. FIG. 2 depicts a general architecture of the VSS system 100 illustrated in FIG. 1. Those skilled in the art will appreciate that the VSS system 100 may include more (or fewer) components than those shown in FIG. 2. It is not necessary, however, that all of these generally conventional components be shown in order to provide an enabling disclosure.

The VSS system 100 includes a processing unit 202, a network interface 204, a non-transitory computer-readable medium drive 206, and an input/output device interface 208, all of which may communicate with one another by way of a communication bus. As illustrated, the VSS system 100 is optionally associated with, or in communication with, an optional display 218 and an optional input device 220. The display 218 and input device 220 may be used in embodiments in which users interact directly with the VSS system 100, such as an integrated in-store kiosk, for example. In other embodiments, the display 218 and input device 220 may be included in a user computing device 102 shown in FIG. 1. The network interface 204 may provide the VSS system 100 with connectivity to one or more networks or computing systems. The processing unit 202 may thus receive information and instructions from other computing systems (such as the user computing device 102) or services via a network, such as network 106. The processing unit 202 may also communicate to and from memory 210 and further provide output information for an optional display 218 via the input/output device interface 208. The input/output device interface 208 may accept input from the optional input device 220, such as a keyboard, mouse, digital pen, touch screen, or gestures recorded via motion capture. The input/output device interface 220 may also output audio data to speakers or headphones (not shown).

The memory 210 may contain computer program instructions that the processing unit 202 executes in order to implement one or more embodiments of the VSS system 100. The memory 210 generally includes RAM, ROM and/or other persistent or non-transitory computer-readable storage media. The memory 210 may store an operating system 214 that provides computer program instructions for use by the processing unit 202 in the general administration and operation of the VSS system 100. The memory 210 may further include other information for implementing aspects of the VSS system 100. For example, in one embodiment, the memory 210 includes a user interface module 212 that facilitates generation of user interfaces (such as by providing instructions therefor) for display upon a computing device such as user computing device 102. The user interface may be displayed via a navigation interface such as a browser installed on the user computing device 102. In addition, memory 210 may include or communicate with the content data store 112. Content stored in the content data store 112 may include items of textual content and/or items of audio content, as described in FIG. 1.

In addition to the user interface module 212, the memory 210 may include a similarity analysis module 216 that may be executed by the processing unit 202. In one embodiment, the similarity analysis module 216 may be used to implement the VSS system 100, example operations of which are discussed below with respect to FIG. 3 and FIG. 4.

In some embodiments, the VSS system 100 may be implemented partially or entirely by the user computing device 102. Accordingly, the user computing device 102 may include a similarity analysis module 216 and other components that operate similarly to the components illustrated as part of the VSS system 100, including a processing unit 202, network interface 204, non-transitory computer-readable medium drive 206, input/output interface 208, memory 210, user interface module 212, and so forth.

Examples of Methods Performed by a Version Similarity Scoring (VSS) Service

Figure 3:
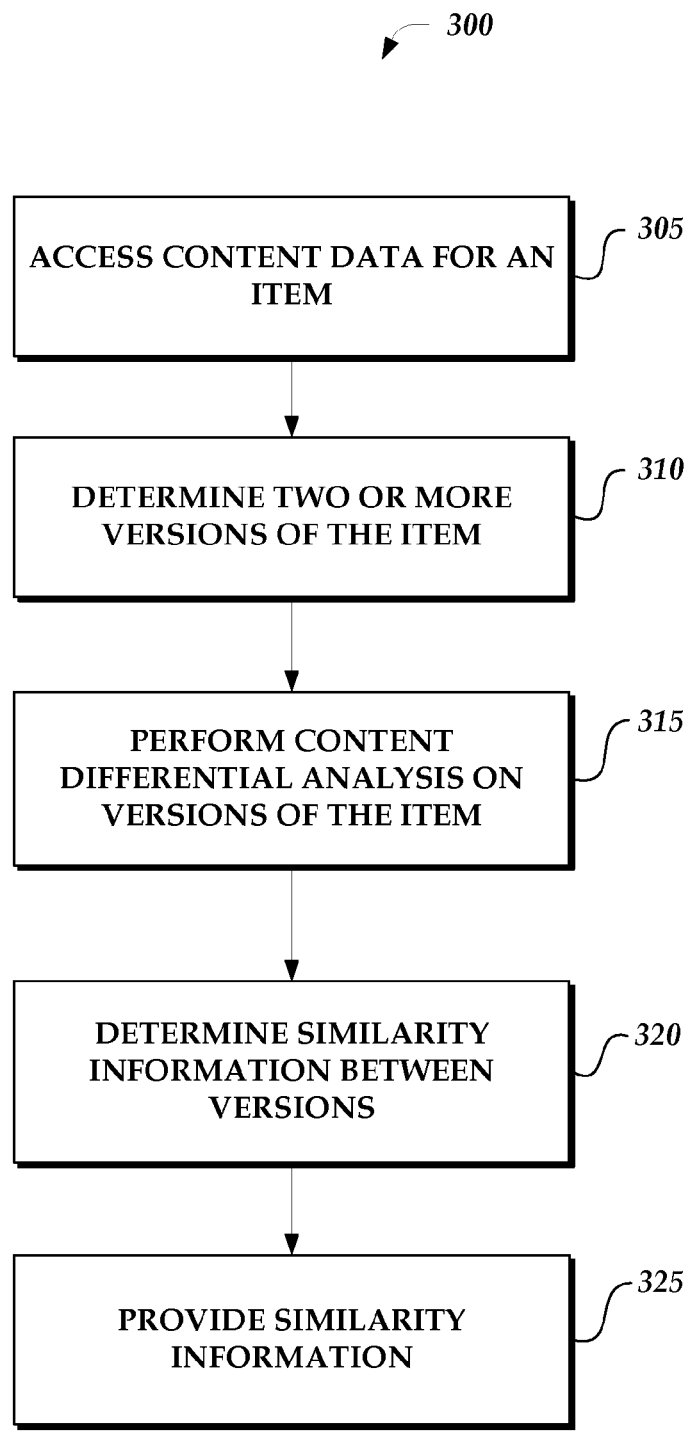
FIG. 3 is a flow diagram of an embodiment of a process for analyzing the content difference between multiple versions of an item and/or item content involving a version similarity scoring system, such as the version similarity scoring system of FIGS. 1 and 2.
Figure 4:
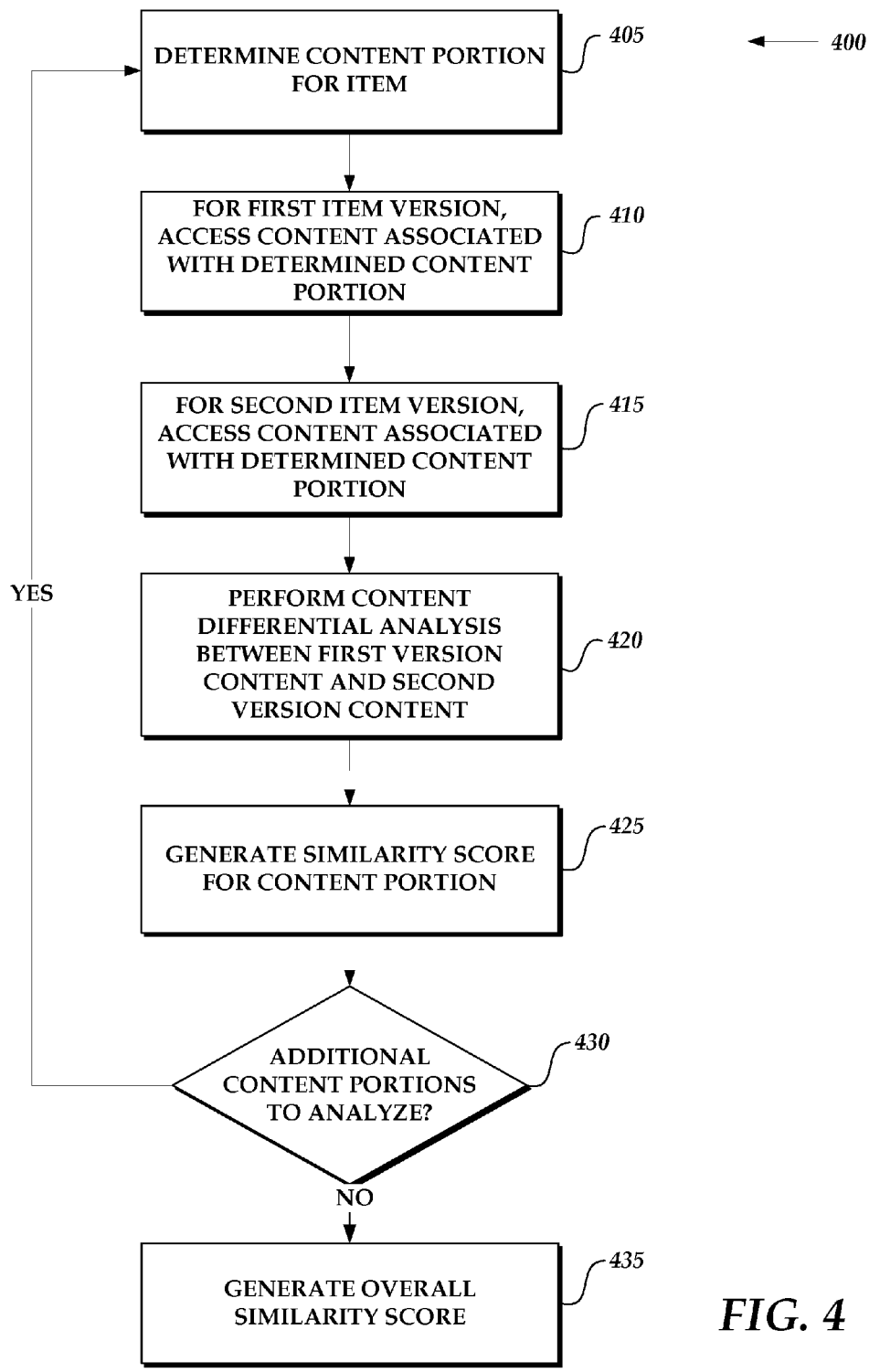
FIG. 4 is a flow diagram of an embodiment of a process for performing a content differential analysis between two versions of an item and/or item content involving a version similarity scoring system, such as the version similarity scoring system of FIGS. 1 and 2.

FIGS. 3 and 4 are flow diagrams for various embodiments of similarity scoring routines. In some implementations, the routines are performed by embodiments of the VSS system 100 described with reference to FIGS. 1 and 2 or by one of its components, such as the similarity analysis module 216. The example scenarios are intended to illustrate, but not to limit, various aspects of these systems and/or services. In one embodiment, the routines can be dynamic, with some procedures omitted and others added. In one example, multiple instances of the routines may occur concurrently, for different content similarity scoring services.

FIG. 3 is a flow diagram illustrating an embodiment of a process 300 for analyzing a difference between multiple versions of an item and/or item content. The process 300 may be executed, for example, by the scoring analysis module 216 of the VSS system 100 of FIG. 2. The process 300 is described herein primarily with respect to comparing two versions of an item or item of content, however the process 300 may be applied to more than two versions of an item in order to analyze cross-version similarity across some or all versions of the item. Further, the content differential analysis described herein may be performed for multiple versions sequentially or in parallel and/or substantially in real-time.

At block 305, the VSS system 100 accesses content data for an item. The content data may be accessed, for example, from the content data store 112. Content data to be analyzed and compared may include, but is not limited to, item content (such as text in a book) as well as information content about the item itself (e.g., metadata and/or item detail information, such as technical specifications for an electronic device). Content data may be alphabetical, numeric, alphanumeric, symbolic, graphical/visual, audio content, and any other type of content described herein which may be stored and accessed from the content data store 112.

At block 310, the VSS system 100 identifies two or more versions of the item. In some instances, the versions may be indicated by the content data itself. For example, different versions of textbooks may have different International Standard Book Numbers ("ISBN" s) along with an indication that, although the ISBNs are different, they correspond to different version of the same book or title. In some instances, versions may be identified by performing an initial content analysis on the accessed content data. For example, a title, an item name and/or other basic identifying information about an item may be analyzed to identify multiple potential versions of the item. In some embodiments, the human interaction task system 108 may be advantageously used to facilitate identification of multiple versions of the item via HIT tasks At block 315, the VSS system 100 performs a content differential analysis on the identified versions of the item. The content differential analysis may be a computationally intense process that involves various degrees of content comparison and analysis, ranging from cursory comparison of one or more portions of the content to full comparison (e.g., "brute force" techniques which may involve, for example, checking or comparing every single character or word in a base version against a pattern of characters or words in a comparison version in order to determine whether and/or to what extent the pattern is found in the base version) of the entire content. As one example, a full content comparison may involve calculating word counts for some or all portions of each version of the content being compared; analyzing differences in textual positioning (e.g., structure, order, position) of letters, words, sentences, paragraphs, chapters, etc.; calculating, weighting, and/or averaging Levenshtein distances (e.g., a string metric for measuring the difference between two sequences) at one or more sequences of characters of varying lengths (e.g., letters, words, sentences, paragraphs, chapters). In some embodiments the content comparison may be facilitated by the use of the human interaction task system 108 and HITS as described herein. For example, a HIT may be provided the human interaction task system 108 to compare content such as a book title which may be highly dissimilar based on a textual comparison, but may be highly similar from a semantic comparison which may be more easily identified by a human. For example, a base edition of a book may have the title "Introduction to Biology" while a comparison edition of the book may have the title "Fundamentals of Bioscience." Using a computer-based textual comparison, only the portion "bio" may be identified as similar, whereas a human, via a HIT, may identify these titles as similar. An example of a content differential analysis process which may be performed at block 310 is the process 400 illustrated and described with reference to FIG. 4 herein.

At block 320, the VSS system 100 determines similarity information (e.g., scores, rankings or any other similarity metric described herein) between the identified versions of the item. Similarity information may be generated in a variety of formats (e.g., numeric score, percentage, letter score, rank, etc.). In some embodiments, the similarity information may include actual content of one or more of versions of the item content, such as to provide a portion of content that is found to be different, to further highlight the differences to a user viewing the similarity information on a network page or other user interface. This may be of particular value in instances where differences are determined to be minimal (or conversely, a high degree of similarity), and the user may want to know exactly what is the determined difference. For example, an item detail page which displays the similarity information may include a content preview option which may display the two versions of the content "side-by-side" (or in any arrangement) with the identified differences highlighted so that a user viewing the item detail page can quickly see the differences.

As illustrated and described with reference to FIG. 4 herein, the similarity information may also include sub-scores for one or more content portions associated with the item. Thus for example, the similarity information determined at block 310 may include an overall similarity score indicating a relative similarity between two versions of the item, as well as one or more sub-scores indicating a relative similarity between content portions of the item. Continuing the textbook example, similarity scores generated by the VSS system 100 for two editions of a textbook might include a general "edition" similarity score (e.g., a similarity score between a base and a comparison edition of a book), and optionally one or more specific section similarity scores (e.g., similarity scores between a table of contents, chapters, problem sets, etc.).

At block 325, the VSS system 100 provides the similarity information, for example, to a user viewing a user interface for the item, such as an item detail page. The similarity information may be provided, for example, to the user via the user interfaces 500 or 600 illustrated and discussed herein with reference to FIGS. 5 and 6 respectively.

FIG. 4 is a flow diagram illustrating an embodiment of a process 400 for performing a content differential analysis between two versions of an item and/or item content. The process 400 may be executed, for example, by the similarity analysis module 216 of the VSS system 100 of FIG. 2. As with the process 300 of FIG. 3, the process 400 is described primarily with respect to comparing two versions of an item or item of content, however the process 400 may be applied to more than two versions of an item in order to generate, for example, cross-version similarity scores across some or all versions of the item. Further, the content differential analysis described herein may be performed for multiple versions sequentially or in parallel, and/or substantially in real-time.

At block 405, the VSS system 100 may determine a content portion for the item to be analyzed. The content portion may be, for example, a predetermined or pre-identified content portion of the item content. For example, the item content may include metadata content which identifies one or more content portions, such as a title of the work, table of contents information, chapter titles, and the like (e.g., for a book such as a textbook). Or, in another example, metadata content may describe or identify content portions about an item (e.g., make, model, technical specifications, item detail information, and the like). In some embodiments, one or more content portions may be identified by a human worker as part of a HIT, using the human interaction task system 108 described with reference to FIGS. 1 and 2 herein.

Once the content portion has been determined, at block 410 the VSS system 100 may access content associated with the determined content portion for a first (or base) version of the item ("first version content") to be analyzed and compared. Similarly, at block 415, the VSS system 100 may access content associated with the determined content portion for a second (or comparison) version of the item ("second version content") to be analyzed and compared. In some instances, the process 400 at blocks 410 and 415 may be repeated an indeterminate number of times depending on the number of versions of the item to be analyzed and compared.

Continuing at block 420, the VSS system 100 performs a content differential analysis between the first version content and the second version content. The content differential analysis may be conducted in various ways as described herein, including but not limited to brute-force textual or "string" based comparison methods, as well as human-task assisted methods utilizing the human task interaction system 108 described with reference to FIGS. 1 and 2 herein. For example, the content differential analysis can use a string metric (also known as a string similarity metric or string distance function) to measure similarity or dissimilarity (e.g., a distance) between different content (e.g., text strings). In some such examples, the string metric can include a Levenshtein distance or other measure or indicia of content matching, similarity or dissimilarity. For example, the VSS system 100 may calculate a Levenshtein distance between at least a portion of the first content and a corresponding portion of the second content; and determine the amount of similarity based at least in part on the calculated Levenshtein distance, wherein the amount of similarity is high if the Levenshtein distance is within a threshold distance, and the amount of similarity is low if the Levenshtein distance is not within the threshold distance.

At block 425, the VSS system 100 generates a similarity score (or other similarity metric) for the determined content portion based at least in part on the results of the content differential analysis performed at block 420. For example, the similarity score may indicate a high degree or percentage of similarity if the content differential analysis results indicate a low degree of difference in the content between the first and second versions of the item. To give but one numeric example, for a book item with a similar title between a first and second edition (e.g., "Business Law, 1st Edition" vs. "Business Law, 2nd Edition") a similarity score may be relatively high (e.g., 95/100) due to the same title except for the edition indicator). In another hypothetical example, a book item with a different title between a first and second edition (e.g., "Fundamentals of Biology, 1st Edition" vs. "Introduction to the Biological Sciences, 2nd Edition") a similarity score may be relatively low (e.g., 10/100) due to the almost completely revised title. Many variations on the similarity score are possible depending on the particular implementation and degree of similarity found between versions. Further, similar to the process 300 described with reference to FIG. 3 herein (in particular block 320), the similarity score and/or similarity information may include some of the actual content that is analyzed during the content differential analysis process performed at block 420.

At block 430, the VSS system 100 may determine whether there are additional content portions for the item to be analyzed. If there are additional content portions to be analyzed, the process 400 may return to block 405, and the VSS system 100 may perform the process 400 from block 405 to block 425 an indeterminate number of times until all determined or identified content portions have been analyzed. For example, the process 400 from block 405 to block 425 may repeat (either sequentially or in parallel) to analyze, for example, a textbook's table of contents, preface, chapter titles, chapter sub-headings, chapter contents (e.g., using a computationally intense "brute force" textual comparison technique performed programmatically by the VSS system 100, and/or in some instances by a human via a HIT, which may involve, for example, checking or comparing every single character or word in a base version against a pattern of characters or words in a comparison version in order to determine whether and/or to what extent the pattern is found in the base version), problem sets (e.g., questions and/or answers, if known), pictures or graphics used in the textbook, audio content (if applicable), and any other discrete portion of the content until all portions have been analyzed and compared.

Once all of the determined or identified content portions have been analyzed, the process 400 may proceed to block 435, where the VSS system 100 may generate an overall similarity score. The overall similarity score may, for example, be generated by performing a weighted calculation of the similarity scores generated for each of the respective content portions. The relative weights for each content portion may be predetermined or defined. For example, in the textbook example, the relative weight for the similarity score of the title may be low because a potential consumer of the textbook might care more about the actual contents of the textbook than the title itself. Thus, the relative weight for the similarity scores of the chapter contents may be given a higher value relative to the title or the table of contents. In another example, the relative weight for the similarity scores of the problem sets in the textbook may be given an even higher value since many consumers (e.g. students or professors) might be most interested in how much the problem sets have changed (e.g., to help inform a purchase decision when taking or planning an academic course). In yet another example, the relative weight for the similarity scores of the preface, bibliography, endnotes, and/or errata may be given lower values as these sections or portions may be of relative less importance to the consumer. In other embodiments, the relative weights may be determined based, for example, on the relative size of the content portions. Thus, for example, longer chapters may receive a relatively higher weight than shorter chapters, since the longer chapters represent a proportionally longer portion of the book as a whole.

In other embodiments, the relative weights may be determined based on or relative to demographics of the target audience/consumer for the item. For example, a student considering the purchase of the latest edition of a textbook might be more concerned with whether or how much the problem sets have changed from the previous edition, and thus the problem sets may receive a relatively higher weight in generating an overall similarity score between the two editions. On the other hand, a professor considering whether to use the latest edition of the textbook in a course offering might be more concerned with whether or how much the chapter contents have changed from the previous edition, and thus the chapter contents may receive a relatively higher weight in generating an overall similarity score between the two editions. Other demographic characteristics may be used if known or available, including but not limited to, geographic location, age, income level, and the like.

Any variation of the weighting methodologies described above may be used, separately or combined, to generate an overall similarity score. In addition, other methodologies not described herein may be used to combine the similarity scores for the content portions into an overall similarity score, including, for example, linear regression modeling and/or other advanced computer modeling techniques.

Example User Interfaces

Figure 5:
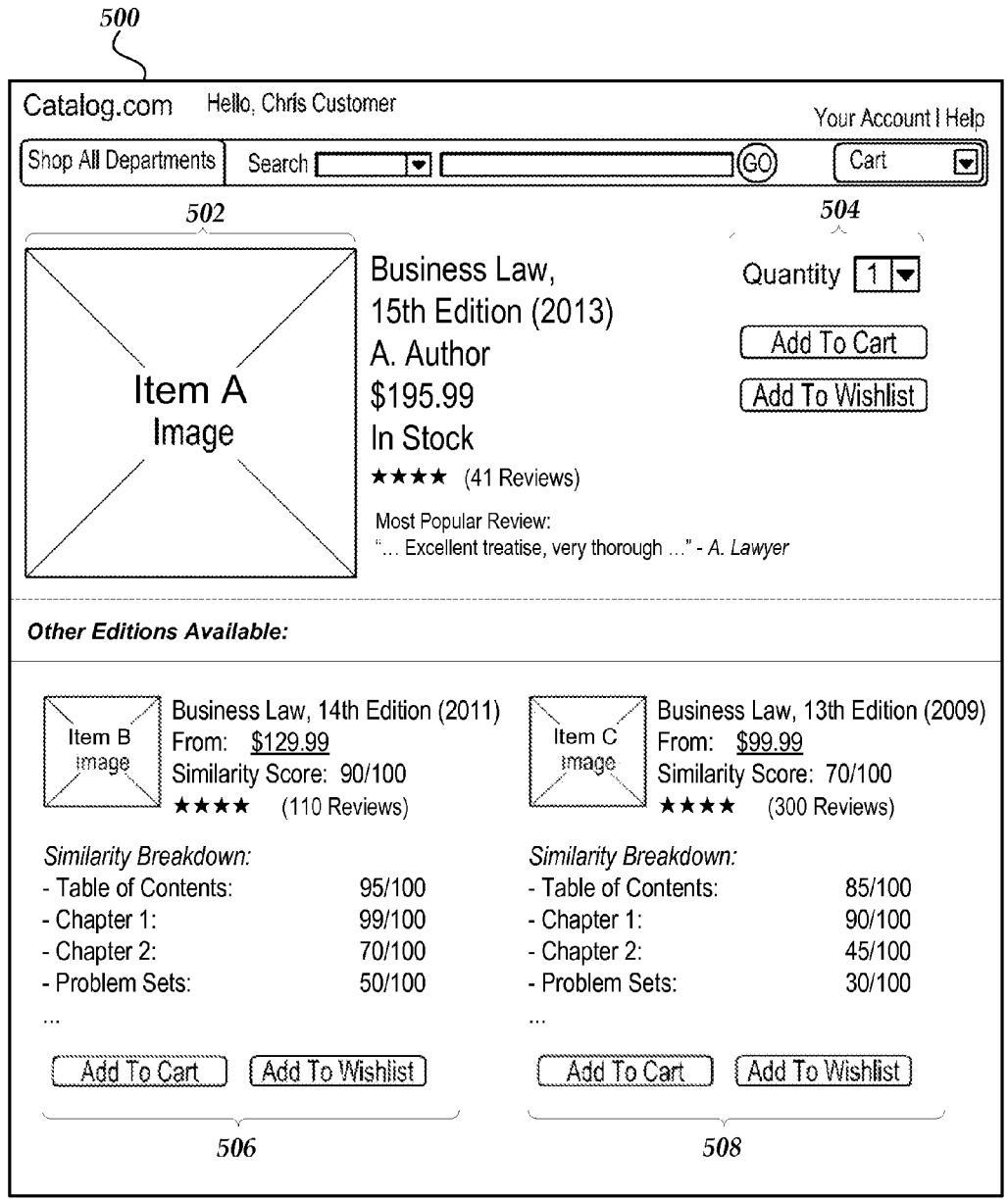
FIG. 5 is a pictorial diagram of an example user interface that illustrates a item detail page including version similarity information for multiple editions of a book, as generated by a version similarity scoring system, such as the version similarity scoring system of FIGS. 1 and 2.
Figure 6:
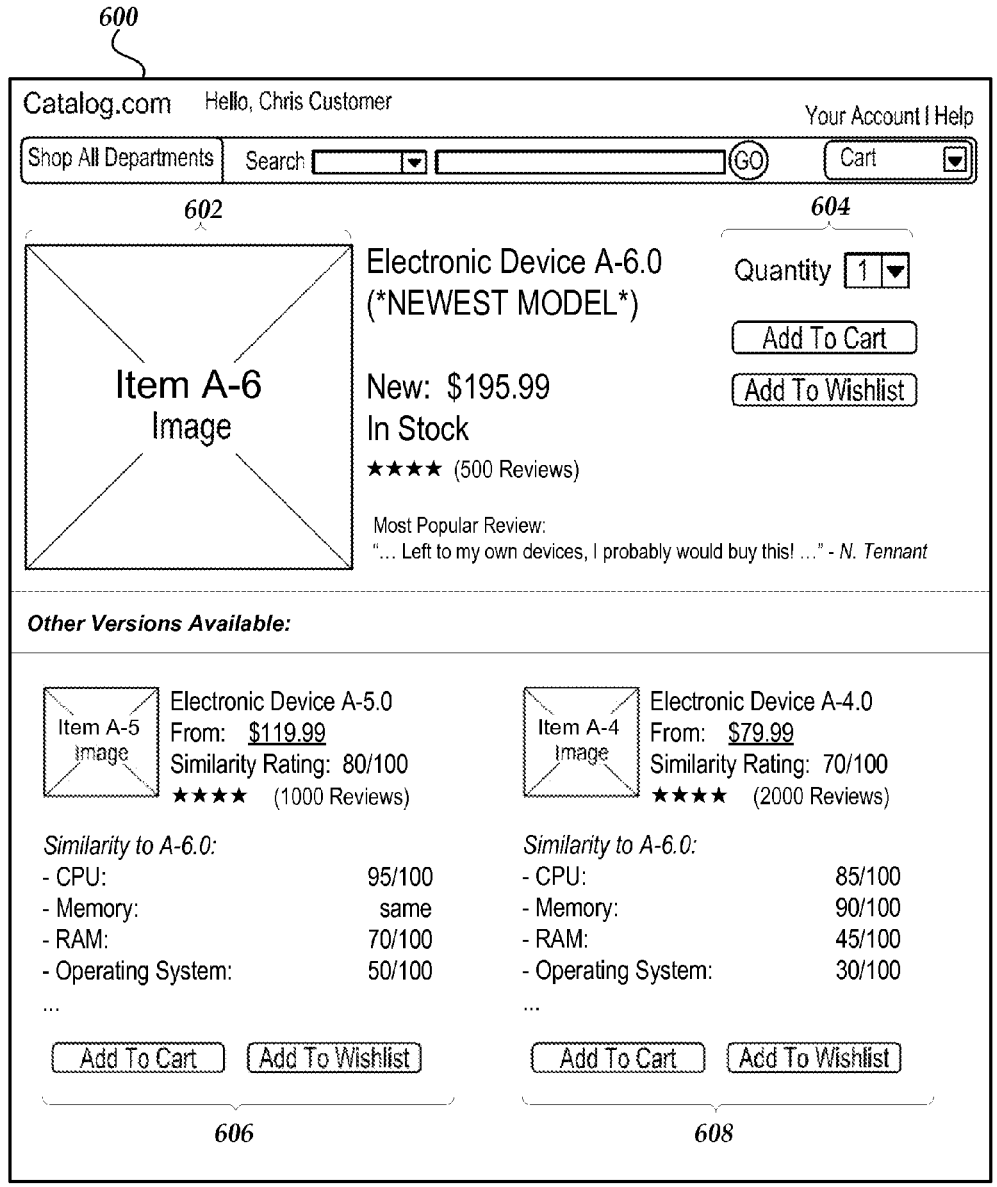
FIG. 6 is a pictorial diagram of an example user interface that illustrates a item detail page including version similarity information for multiple versions of an electronic device, as generated by a version similarity scoring system, such as the version similarity scoring system of FIGS. 1 and 2.

FIGS. 5 and 6 illustrate sample user interfaces that may be generated by or used with the VSS system 100, and that may provide various user interface controls to enable functionality as described in this disclosure. In various embodiments, each of the user interfaces shown in FIGS. 5 and 6 may be presented as a network page (e.g., a web page), as a mobile application display, as a stand-alone application display, as an email message, as a text message (e.g., a short message service (SMS) or a multimedia messaging service (MMS) message) or in other communication displays. In other embodiments, analogous interfaces may be presented using audio or other forms of communication. In an embodiment, the interfaces shown in FIGS. 5 and 6 are configured to be interactive and respond to various user interactions. Such user interactions may include clicks with a mouse, typing with a keyboard, touches and/or gestures on a touch screen, voice commands, and/or the like.

FIG. 5 illustrates an example user interface 500 that presents an item detail page including details regarding "Item A," along with version similarity information for other versions of Item A generated by a version similarity scoring system, such as the VSS system 100 of FIGS. 1 and 2. "Item A" may, for example, be a book, an electronic book, a movie, music download, consumer product, or any other product or service available from an electronic catalog system. In other environments, the item represented on the item detail page may, for example, be a news story, news feed, web site, blog, author, musical artist, restaurant, or other type of item. In the particular example shown in FIG. 5, "Item A" is a book entitled "Business Law, 15th Edition" with a publication date of 2013 and a list price of $195.99. In other examples as mentioned herein, the editions may be of other types, including non-numeric editions, such as domestic and international editions of the same book.

The user interface 500 includes a number of distinct areas that can be used to display page features that contain various types of content. The example page features (e.g., 502, 504, 506, and 508) illustrated in FIG. 5 are intended to schematically illustrate certain types of page features that can be used on an example user interface, but are not intended to be limiting. For example, the content, appearance, positioning, sizes and so forth of the page features may be different than shown.

The example page feature 502 includes an image of the item and a brief description of the item (e.g., title, price and whether the item is in stock). Page feature 504 includes input controls selectable by Chris Customer to specify a number of items for purchase, and to add the item to a shopping cart or to a wishlist. Page features 506 and 508 reflect other versions (here, "editions") of "Item A" which may be available for purchase, along with similarity information which may be generated by the VSS system 100 as part of the processes and methods described herein (for example, described with reference to FIGS. 3 and 4).

For example, page feature 506 shows a listing of "Item B," the book "Business Law, 14th Edition" with a publication date of 2011 and prices starting from $129.99. Page feature 506 also includes a similarity score (e.g., "90/100") indicating the relative similarity of the 14th edition ("Item B") to the 15th edition ("Item A"). Further, in the example shown in FIG. 5, similarity score "breakdown" information is displayed for various content portions comparing the two editions, including but not limited to similarity scores for a table of contents, chapter 1, chapter 2, problem sets, etc. In some instances these similarity "sub-scores" may not be displayed, or may be displayed in response to the user selecting an actionable user interface element displayed as part of the user interface 500 (e.g., a link or button to "show me more detail," not illustrated in FIG. 5).

Similarly, page feature 508 shows a listing of "Item C," the book "Business Law, 13th Edition" with a publication date of 2009 and prices starting from $99.99. Page feature 508 also includes a similarity score (e.g., "70/100") indicating the relative similarity of the 13th edition ("Item C") to the 15th edition ("Item A"). Page feature 508 also includes the similarity score "breakdown" information displayed for various content portions comparing the 13th and 15th editions.

FIG. 6 illustrates an example user interface 600 that presents an item detail page including details regarding "Item A-6," along with version similarity information for other versions of Item A-6 generated by a version similarity scoring system, such as the VSS system 100 of FIGS. 1 and 2. The "Item A-6" may, for example, be a book, an electronic book, a movie, music download, consumer product, or any other product or service available from an electronic catalog system. In other environments, the item represented on the item detail page may, for example, be a news story, news feed, web site, blog, author, musical artist, restaurant, or other type of item. In the particular example shown in FIG. 6, "Item A-6" is an electronic device "Electronic Device A-6.0," with an indication that this is the "NEWEST MODEL" with a list price of $195.99.

The user interface 600 includes a number of distinct areas that can be used to display page features that contain various types of content. The example page features (e.g., 602, 604, 606, and 608) illustrated in FIG. 6 are intended to schematically illustrate certain types of page features that can be used on an example display page, but are not intended to be limiting. For example, the content, appearance, positioning, sizes and so forth of the page features may be different than shown.

The example page feature 602 includes an image of the item and a brief description of the item (e.g., title, price and whether the item is in stock). Page feature 604 includes input controls selectable by Chris Customer to specify a number of items for purchase, and to add the item to a shopping cart or to a wishlist. Page features 606 and 608 reflect other versions of "Item A-6" which may be available for purchase, along with similarity information which may be generated by the VSS system 100 as part of the processes and methods described herein (for example, described with reference to FIGS. 3 and 4).

In this example, page feature 606 shows a listing of "Item A-5," an earlier version of "Electronic Device A-6.0" with prices starting from $119.99. Page feature 606 also includes a similarity rating (e.g., "80/100") indicating the relative similarity of version 5.0 ("Item A-5") to version 6.0 ("Item A-6"). Further, in the example shown in FIG. 6, similarity score detail information is displayed for various content portions comparing the two versions, including, but not limited to, similarity scores for a CPU, a memory, a RAM, an operating system, etc. In some instances these similarity "sub-scores" may not be displayed, or may be displayed in response to the user selecting an actionable user interface element displayed as part of the user interface 600 (e.g., a link or button to "show me more detail," not illustrated in FIG. 6).

Similarly, page feature 608 shows a listing of "Item A-4," another earlier version of "Electronic Device A-6.0" with prices starting from $79.99. Page feature 608 also includes a similarity rating (e.g., "70/100") indicating the relative similarity of version 4.0 ("Item A-4") to version 6.0 ("Item A-6"). Page feature 608 also includes the similarity score detail information displayed for various content portions comparing the two versions.

Figure 7:
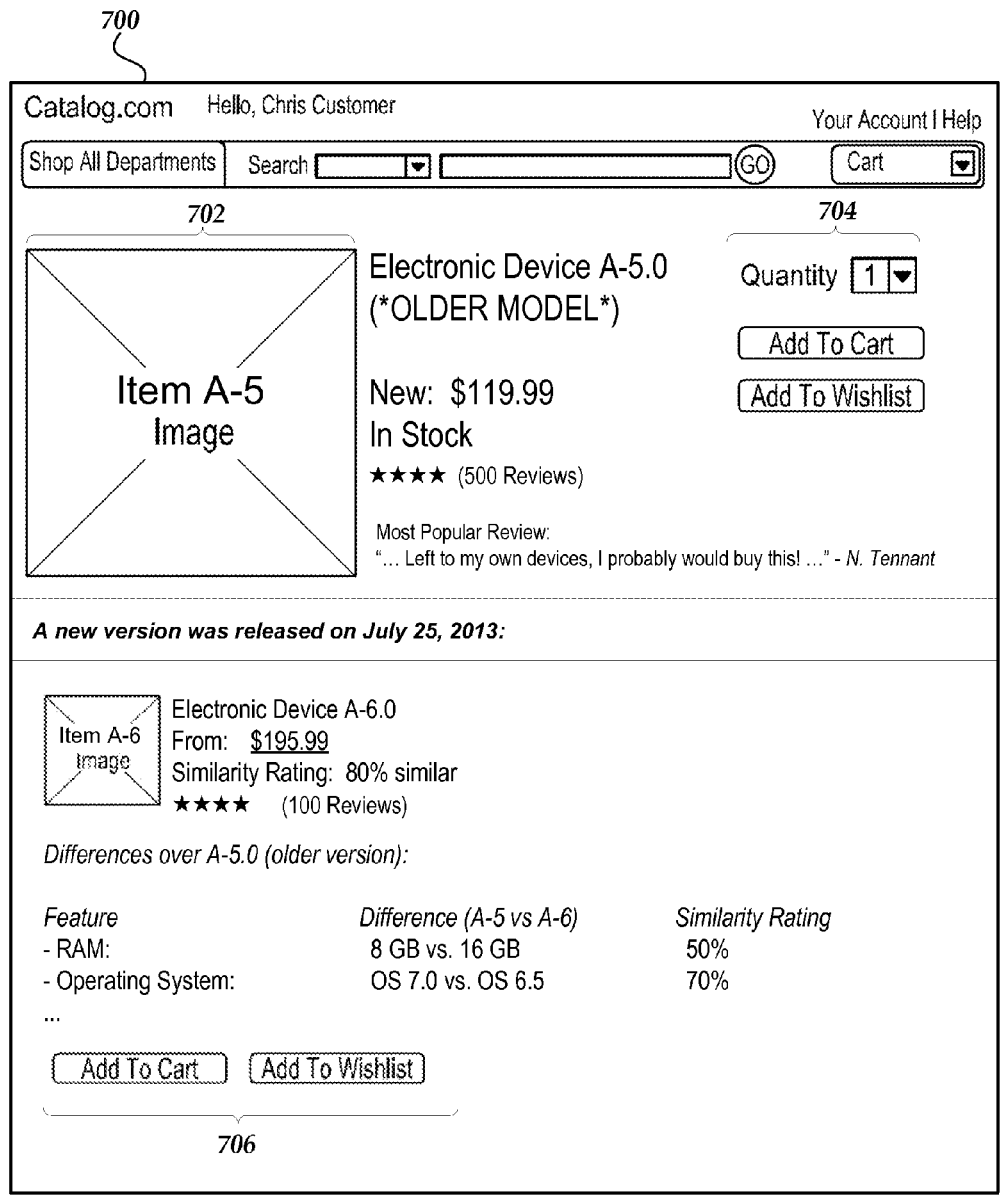
FIG. 7 is a pictorial diagram of an example user interface that illustrates another item detail page including version similarity information for multiple versions of an electronic device, as generated by a version similarity scoring system, such as the version similarity scoring system of FIGS. 1 and 2.

FIG. 7 illustrates an example user interface 700 that presents an item detail page including details regarding "Item A-5," along with version similarity information for other versions of Item A-5 generated by a version similarity scoring system, such as the VSS system 100 of FIGS. 1 and 2. The "Item A-5" may, for example, be a book, an electronic book, a movie, music download, consumer product, or any other product or service available from an electronic catalog system. In other environments, the item represented on the item detail page may, for example, be a news story, news feed, web site, blog, author, musical artist, restaurant, or other type of item. In the particular example shown in FIG. 7, "Item A-5" is an electronic device "Electronic Device A-5.0," with an indication that this is an "OLDER MODEL" with a list price of $119.99.

The user interface 700 includes a number of distinct areas that can be used to display page features that contain various types of content. The example page features (e.g., 702, 704, 706, and 708) illustrated in FIG. 7 are intended to schematically illustrate certain types of page features that can be used on an example display page, but are not intended to be limiting. For example, the content, appearance, positioning, sizes and so forth of the page features may be different than shown.

The example page feature 702 includes an image of the item and a brief description of the item (e.g., title, price and whether the item is in stock). Page feature 704 includes input controls selectable by Chris Customer to specify a number of items for purchase, and to add the item to a shopping cart or to a wishlist. Page feature 706 reflects information about a "newer version" of "Item A-5" which may be available for purchase, along with similarity information which may be generated by the VSS system 100 as part of the processes and methods described herein (for example, described with reference to FIGS. 3 and 4).

In this example, page feature 706 shows a listing of "Item A-6," a newer version of "Electronic Device A-5.0" with prices starting from $195.99. Page feature 706 also includes a similarity rating (e.g., "80% similar") indicating the relative similarity of version 5.0 ("Item A-5") to version 6.0 ("Item A-6"). Further, in the example shown in FIG. 7, similarity score and item difference detail information is displayed for various content portions comparing the two versions, including detail information related to the actual difference and calculated similarity ratings for a RAM and an operating system. In some instances these similarity ratings may not be displayed, or may be displayed in response to the user selecting an actionable user interface element displayed as part of the user interface 700 (e.g., a link or button to "show me more detail," not illustrated in FIG. 7). In some implementations, the item difference detail information includes information only on features that are different between the versions and does not include detail information on features that are the same or substantially similar between the versions. Such item difference detail information may allow the user to easily determine, at a glance, the key differences between the versions.

Additional Embodiments

In some embodiments, the VSS system 100 may be configured differently, include different components or modules, and/or omit some components or modules shown in FIGS. 1 and 2. For example, in one embodiment, VSS system 100 includes one or more hardware processors in communication with a computer readable medium storing software modules including instructions that are executable by the one or more hardware processors, and one or more software modules. The one or more software modules may instruct a computing system to execute the various methods, approaches, and/or techniques as described herein.

As described above, the VSS system 100 can be implemented by a computing system that includes one or more physical servers or other computing machines, such as several computing machines interconnected via a network. Thus, each of the components depicted in the VSS system 100 can include hardware and/or software for performing various features. In one embodiment, the VSS system 100 is implemented in association with a network site or collection of network sites.

The VSS system 100 can include one or more servers for receiving and responding to network requests from the user computing devices 105. The one or more servers can include network servers, application servers, database servers, combinations of the same, or the like. In some embodiments, the network 106 is a publicly accessible network of linked networks, possibly operated by various distinct parties, such as the Internet. In other embodiments, the network 106 may be a private network, such as, for example, a corporate or university network that is wholly or partially inaccessible to non-privileged users. In still other embodiments, the network 106 may include one or more private networks with access to and/or from the Internet.

The processing of the various components of the VSS system 100 can be distributed across multiple machines, networks, and other computing resources. The various components of the VSS system 100 can also be implemented in one or more virtual machines, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

In some embodiments, the VSS system 100 may be configured differently than illustrated in the figures and described above. For example, various functionalities provided by the illustrated modules can be combined, rearranged, added, or deleted. In some embodiments, additional or different processors or modules may perform some or all of the functionalities described with reference to the example embodiment illustrated in the figures. Many implementation variations are possible.

In some embodiments, the VSS system 100 may be implemented on, or in communication with, one or more hosted computing environments. The hosted computing environments may include a collection of rapidly provisioned and released computing resources hosted in connection with the VSS system 100. Such computing resources may be referred to, individually, as host computing devices. The computing resources may further include a number of computing, networking and storage devices in communication with one another. In some embodiments, the computing devices may correspond to physical computing devices. In other embodiments, the computing devices may correspond to virtual machine instances implemented by one or more physical computing devices. In still other embodiments, computing devices may correspond to both virtual computing devices and physical computing devices. One example of a hosted computing environment is given in U.S. Pat. No. 7,865,586, issued on Jan. 4, 2011 and entitled "Configuring Communications Between Computing Nodes," which is hereby incorporated by reference in its entirety. A hosted computing environment may also be referred to as a cloud computing environment.

Each of the processes, methods, and algorithms described in the preceding sections may be embodied in, and fully or partially automated by, code modules executed by one or more computers, computer processors, or machines configured to execute computer instructions. The code modules may be stored on any type of non-transitory computer-readable medium or tangible computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

Conclusion

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes that come within the meaning and range of equivalency of the claims are to be embraced within their scope.

What is claimed is:

1. A computer system comprising:
    an electronic data store configured to store content data for a book; and
    a computing device in communication with the electronic data store, the computing device configured to:
        access, from the electronic data store, content data for the book, wherein the content data for the book provides an indication that the book is associated with multiple editions, the content data comprising textual content associated with at least one edition of the multiple editions of the book;
        identify an edition of the book and another edition of the book, based at least in part on the indication that the book is associated with multiple editions;
        subsequent to accessing the content data for the book and identifying said edition and said another edition of the book, perform a content differential analysis between said edition of the book and said another edition of the book to determine an amount of similarity between said edition of the book and said another edition of the book, wherein performing the content differential analysis comprises:
            identifying a plurality of content portions of said edition of the book and a corresponding plurality of content portions of said another edition of the book; and
            for each pair of corresponding content portions of said edition and said another edition, generating a sub-score based at least in part on a comparison of the corresponding content portions in the pair;
        generate an overall similarity score between said edition of the book and said another edition of the book based at least in part on the sub-score generated for each pair of corresponding content portions of said edition and said another edition; and
        output the overall similarity score for presentation along with the sub-score generated for each pair of corresponding content portions such that in the presentation, the overall similarity score is accompanied by information identifying said another edition of the book and each sub-score is accompanied by information identifying the pair of corresponding content portions.

2. The system of claim 1, wherein the computing device is further configured to provide the similarity score to another computing device.

3. The system of claim 1, wherein each of the plurality of content portions of said edition and the corresponding plurality of content portions of said another edition comprises at least textual content.

4. The system of claim 1, wherein the content data for the book comprises an electronic representation of a physical print copy of the book.

5. The system of claim 1, wherein the book is a textbook.

6. The system of claim 1, wherein to generate the sub-score the computing device is further configured to:
calculate a Levenshtein distance between the corresponding content portions in the pair; and
determine the amount of similarity based at least in part on the calculated Levenshtein distance,
wherein the amount of similarity is high if the Levenshtein distance is within a threshold distance, and the amount of similarity is low if the Levenshtein distance is not within the threshold distance.

7. The system of claim 1, wherein the computing device is further configured to output the overall similarity score for presentation such that in the presentation, the overall similarity score is accompanied by a content preview option for displaying a side-by-side content comparison of one or more pairs of the corresponding content portions, wherein differences between the corresponding content portions in each pair are to be highlighted in the displayed side-by-side content comparison.

8. A computer-implemented method comprising:
as implemented by a computing device configured with specific computer-executable instructions,
identifying, for a book, at least an edition and another edition, based at least in part on an indication that the book is associated with multiple editions;
accessing content associated with said edition and content associated with said another edition;
subsequent to identifying at least said edition and said another edition for the book and accessing the content associated with said edition and the content associated with said another edition, identifying a plurality of content portions of said edition of the book and a corresponding plurality of content portions of said another edition of the book;
for each pair of corresponding content portions of said edition and said another edition, generating a sub-score based at least in part on a relative amount of similarity between the corresponding content portions in the pair;
generating overall similarity score information between said edition and said another edition, based at least in part on the sub-score generated for each pair of corresponding content portions of said edition and said another edition; and
outputting the overall similarity score information for presentation along with the sub-score generated for each pair of corresponding content portions such that in the presentation, the overall similarity score information is accompanied by information identifying said another edition of the book and each sub-score is accompanied by information identifying the pair of corresponding content portions.

9. The computer-implemented method of claim 8, wherein the content portions comprise content selected from one of a title, a publication date, a table of contents, one or more chapters book, a preface, bibliographic content, a prologue or an epilogue.

10. The computer-implemented method of claim 8, wherein the content portions of said edition of the book comprise a complete electronic copy of said edition and wherein the content portions of said another edition of the book comprise a complete electronic copy of said another edition.

11. The computer-implemented method of claim 10, wherein identifying, for the book, said edition and said another edition comprises identifying said edition based at least in part on an International Standard Book Number (ISBN) for said edition of the book and identifying said another edition based at least in part on an ISBN for said another edition of the book.

12. The computer-implemented method of claim 8, wherein the overall similarity score information comprises an overall similarity score indicative of the relative similarity of said edition and said another edition of the book.

13. The computer-implemented method of claim 8, wherein generating the sub-score is based at least in part on information received from a human interaction task system.

14. The computer-implemented method of claim 8, wherein said edition is a domestic edition of the book and said another edition is international edition of the book.

15. The computer-implemented method of claim 8, further comprising outputting the overall similarity score for presentation such that in the presentation, the overall similarity score is accompanied by a content preview option for displaying a side-by-side content comparison of one or more pairs of the corresponding content portions, wherein differences between the corresponding content portions in each pair are to be highlighted in the displayed side-by-side content comparison.

16. A system comprising:
an electronic data store configured to store item content information; and
a computing device in communication with the electronic data store, the computing device being configured to:
identify, for an item, at least a version and another version, based at least in part on an indication that the item is associated with multiple versions;
access content associated with said version and content associated with said another version, wherein the accessed content associated with said version comprises attribute information about said version and the accessed content associated with said another version comprises attribute information about said another version;
subsequent to identifying at least said version and said another version for the item and accessing the content associated with said version and the content associated with said another version, identify a plurality of content portions of said version of the item and a corresponding plurality of content portions of said another version of the item;
for each pair of corresponding content portions of said version and said another version, generate a sub-score based at least in part on a relative amount of similarity between the corresponding content portions in the pair;
generate overall similarity score information between said version and said another version, based at least in part on the sub-score generated for each pair of corresponding content portions of said version and said another version; and
output the overall similarity score information for presentation along with the sub-score generated for each pair of corresponding content portions such that in the presentation, the overall similarity score information is accompanied by information identifying said another version of the item and each sub-score is accompanied by information of corresponding content portions.

17. The system of claim 16, wherein the overall similarity score information comprises a similarity score indicative of the relative similarity of the plurality of content portions of said version and the corresponding plurality of content portions of said another version.

18. The system of claim 16, wherein the content portions are identified based at least in part on a manual associated with the item.

19. The system of claim 16, wherein the item is an electronic device.

20. The system of claim 16, wherein the computing device is further configured to output the overall similarity score for presentation such that in the presentation, the overall similarity score is accompanied by a content preview option for displaying a side-by-side content comparison of one or more pairs of the corresponding content portions, wherein differences between the corresponding content portions in each pair are to be highlighted in the displayed side-by-side content comparison.

21. A non-transitory computer-readable medium storing computer-executable instructions that, when executed by one or more computer systems, configure the one or more computer systems to perform operations comprising:
   accessing, from an electronic data store, content data for an item, wherein the content data for the item provides an indication that the item is associated with multiple versions, the content data comprising content associated with each version of the multiple versions of the item;
   identifying a version of the item and another version of the item, based at least in part on the indication that the item is associated with multiple versions;
   subsequent to accessing the content data for the item and identifying said version and said another version of the item, performing a content differential analysis between said version of the item and said another version of the item to determine an amount of similarity between said version of the item and said another version of the item, wherein performing the content differential analysis comprises:
      identifying a plurality of content portions of said version of the item and a corresponding plurality of content portions of said another version of the item; and
      for each pair of corresponding content portions of said version and said another version, generating a sub-score based at least in part on a comparison of the corresponding content portions in the pair; and
   generating overall similarity score information related to said version of the item and said another version of the item based at least in part on the sub-score generated for each pair of corresponding content portions of said version and said another version; and
   outputting the overall similarity score information for presentation along with the sub-score generated for each pair of corresponding content portions such that in the presentation, the overall similarity score information is accompanied by information identifying said another version of the item and each sub-score is accompanied by information identifying the pair of corresponding content portions.

22. The non-transitory computer-readable medium of claim 21, wherein each of the plurality of content portions of said version and the corresponding plurality of content portions of said another version comprises at least textual content.

23. The non-transitory computer-readable medium of claim 21, the operations further comprising:
   accessing, on a periodic basis, version information about a new version of the item; and
   performing an updated content differential analysis between content of the new version of the item and corresponding content of said or comparison version of the item.

24. The non-transitory computer-readable medium of claim 21, wherein the overall similarity score information comprises an overall similarity score indicative of the relative similarity of the content portions of said version of the item and the corresponding the content portions of said another version of the item.

25. The non-transitory computer-readable medium of claim 21, wherein the operations further comprise providing the overall similarity score information to another computing device.

26. The non-transitory computer-readable medium of claim 25, wherein the overall similarity score information is provided to the other computing device via a user interface configured to display information about the item.

27. The non-transitory computer-readable medium of claim 21, the operations further comprising outputting the overall similarity score for presentation such that in the presentation, the overall similarity score is accompanied by a content preview option for displaying a side-by-side content comparison of one or more pairs of the corresponding content portions, wherein differences between the corresponding content portions in each pair are to be highlighted in the displayed side-by-side content comparison.

* * * * *